United States Patent [19]

Kolakowski

[11] 4,269,810

[45] May 26, 1981

[54] METHOD FOR DESULFATION OF BATTERY MUD

[75] Inventor: Michael A. Kolakowski, Milltown, N.J.

[73] Assignee: NL Industries, Inc., New York, N.Y.

[21] Appl. No.: 950,074

[22] Filed: Oct. 10, 1978

[51] Int. Cl.$^3$ .................. C01G 21/00; C01G 21/12; C01G 21/14

[52] U.S. Cl. .................................................. 423/92

[58] Field of Search ............... 423/92, 619, 635, 434, 423/433, 435

[56] References Cited

U.S. PATENT DOCUMENTS

| | | | |
|---|---|---|---|
| 1,587,623 | 6/1926 | Zuckerman | 423/92 |
| 3,892,563 | 7/1975 | La Point | 423/92 |

OTHER PUBLICATIONS

*Handbook of Chemistry and Physics*, Forty-Third Edition, Published by The Chemical Rubber Publishing Co., (1961), p. 2080.

*Primary Examiner*—O. R. Vertiz
*Assistant Examiner*—Wayne A. Langel
*Attorney, Agent, or Firm*—Gerald K. White; Eugene Striffler, Jr.; Gary M. Nath

[57] ABSTRACT

In connection with the recycling of lead-acid batteries, battery muds are desulfated by adding an aqueous solution of a treating agent comprising soluble alkali metal salts or alkali metal hydroxides to crushed battery components. The treating agent reacts with sulfuric acid and lead sulfate to form an aqueous solution of alkali metal sulfates and precipitated lead compounds. Following separation of the reacted battery mud and other crushed battery components, separation of the soluble alkali metal sulfates and solids such as PbO, PbO$_2$, and precipitated lead compounds is effected.

5 Claims, 1 Drawing Figure

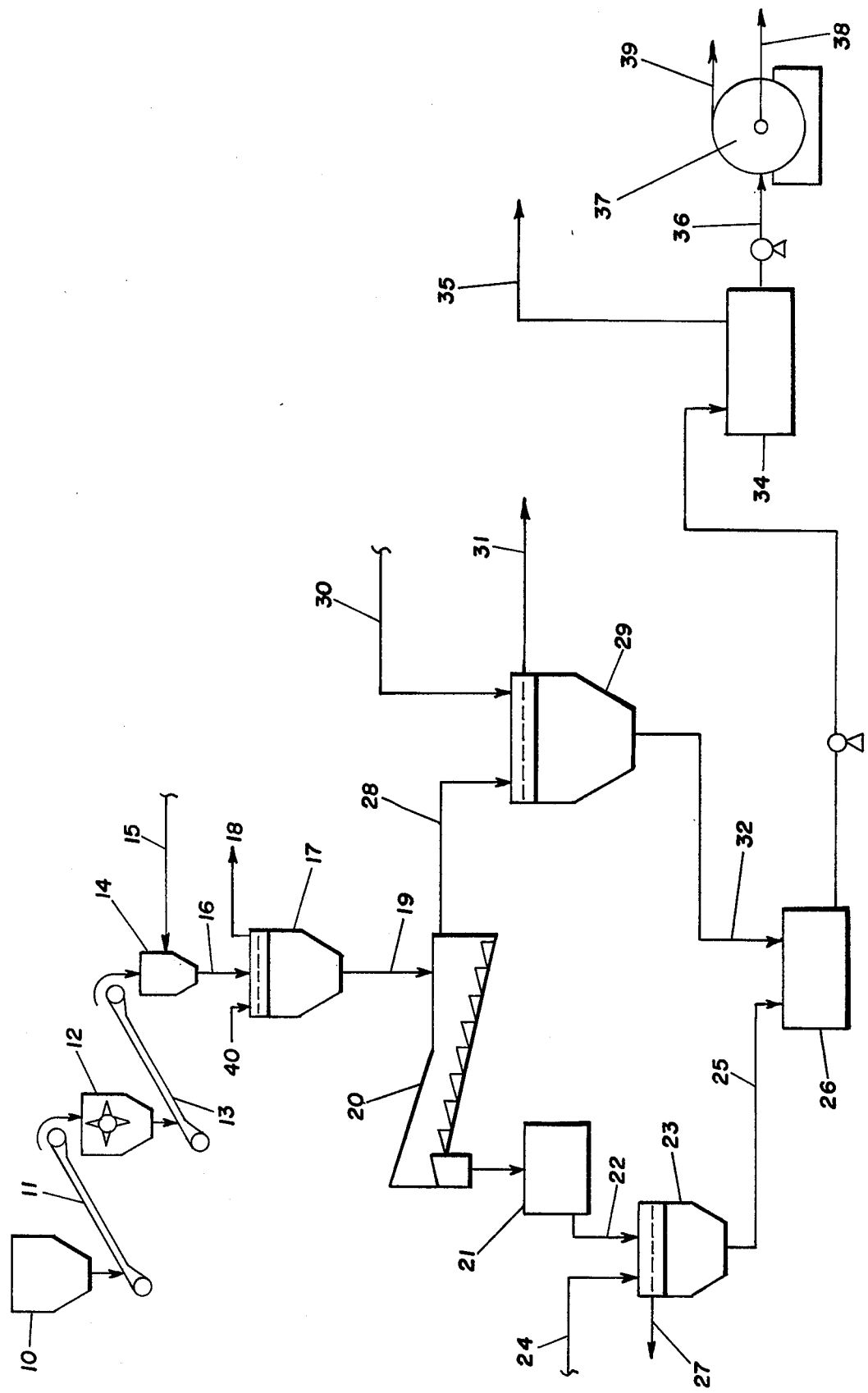

METHOD FOR DESULFATION OF BATTERY MUD

The invention relates to the desulfation of battery mud during a lead-acid battery recycling process wherein scrap batteries are crushed and then combined with an aqueous solution of water soluble alkali metal salts, alkali metal hydroxides, or admixtures thereof. Alkali metal sulfates and precipitated lead compounds are formed thereby. The lead compound precipitates, along with other lead containing compounds such as PbO and $PbO_2$ contained in the battery mud, are then separated from the aqueous solution. Lead values from the lead bearing compounds may be subsequently recovered through reduction of the lead containing compounds in a lead smelter or the like.

In the past, recycling of lead acid batteries has proceeded by draining the free sulfuric acid and then crushing the lead-acid batteries into crushed battery cases and separators, crushed metallics, and battery mud. Battery mud comprises residual sulfuric acid, lead sulfate, PbO, and $PbO_2$. The residual sulfuric acid was then neutralized with a base such as ammonium hydroxide. The lead sulfate in the battery mud, however, was not desulfated. The crushed lead-acid batteries were then separated into their major components by classification and the lead values contained in the crushed metallics and in the battery mud were recovered by reduction in the smelter. A major disadvantage with this process is that as the lead sulfate is reduced in the smelter, $SO_2$ gas forms. To prevent large discharges of $SO_2$ into the atmosphere, extensive and costly off-gas treatment are then required to remove the $SO_2$ prior to discharge of the off-gas into atmosphere.

Previous methods for desulfating battery mud prior to smelting have not proven successful by todays standards. One early method for desulfating battery mud is described in U.S. Pat. No. 2,146,294 and additionally described in a subsequent article by the same patentee entitled "How to Smelt Battery Plate Scrap", *Enigneering and Mining Journal*, 145 (March 1944), page 80 et seq. In this prior art process, recycled lead-acid batteries, prior to smelting, are washed free of sulfuric acid and then the batteries are soaked in an alkaline aqueous solution for several days. The alkaline aqueous solution comprises an alkali metal compound such as sodium carbonate dissolved in water. The lead values were then recovered by smelting the treated lead-acid batteries.

Another prior art method for desulfating battery mud is described in U.S. Pat. No. 3,689,253. In this process lead-acid batteries are crushed into small pieces. Next, the battery mud is separated from the crushed metallics and crushed battery cases and separators. Following separation of the battery mud from the crushed battery material, the mud is thickened and treated with an aqueous solution of an alkaline metal salt or an alkali metal hydroxide. The treated sludge is then separated from the aqueous treating solution which now contains the sulfates. The lead values are subsequently recovered by smelting the treated sludge. A disadvantage with this process is that it requires the battery mud to be separated from the rest of the crushed battery material and thickened prior to treatment.

A further disadvantage connected with adding the desulfating agent following crushing and separation is that the desulfating agent does not neutralize the residual sulfuric acid prior to these steps and, therefore, either the crushing and separation will occur at high acid contents that require expensive material that will not corrode under such conditions, or an additional step of neutralizing the residual sulfuric acid at the crushing and will be required.

U.S. Pat. No. 3,883,348 relates to a process for removal of sulfur from battery wrecker material with use of ammonium carbonate. Sulfur removal is accomplished through reaction of ammonium carbonate with lead sulfate material at a pressure from 5 to 100 psig and a temperature from 20° C. to 80° C. to form lead carbonate and ammonium sulfate.

In contrast to the prior art, the invention provides an efficient, economical, and rapid method for desulfating battery mud as there is no requirement for the battery mud to be separated from the rest of the crushed material and then thickened before it is treated with the alkali metal treating agent. Accordingly, the alkali metal treating agent is introduced into the battery mud during crushing and simplifies the process and decreases the processing time.

This invention relates to a process for desulfating lead-acid battery mud contaning lead sulfate which comprises first crushing lead acid batteries into a crushed material comprised of crushed battery cases and separators, crushed metallics, and battery mud. At this stage, battery mud comprises sulfuric acid, $PbSO_4$, PbO and $PbO_2$. An aqueous solution containing a water soluble alkali metal salt or alkali metal hydroxide treating agent is added to the crushed material so as to react with the sulfuric acid and lead sulfate to form an aqueous solution of alkali metal sulfate and precipitated lead compound in the presence of the treated battery mud. The crushed battery cases and separators and crushed metallics are then separated from the reacted battery mud resulting from the foregoing step. The solid PbO, $PbO_2$, and the resulting lead compound precipitates are then separated from the soluble alkali metal sulfates.

The sole figure is a schematic depiction of a lead-acid battery mud desulfation process in a lead-acid battery recovery system which comprises means for crushing lead-acid batteries, means for introducing an aqueous solution of an alkali metal reagent into the battery mud of the crushed batteries, means for separating the crushed metallics, crushed battery cases and separators from the reacted battery mud, and means for separating the PbO, $PbO_2$ and the formed lead compound precipitates from the formed aqueous solution of alkali metal sulfates.

This invention pertains to desulfating battery mud during a lead-acid battery recycling process. In a typical lead-acid battery recovery process, lead-acid batteries are first crushed into crushed battery cases and separators, and crushed metallics. The metallics comprise lead alloy grids and terminals, and battery mud. Battery mud comprises sulfuric acid, lead sulfate, PbO, and $PbO_2$. These components are then separated by various well known techniques so that the lead values contained in the battery mud and crushed metallics can be recovered by conventional means such as smelting. In addition to the techniques described hereinafter for crushing lead-acid batteries and separating them into various components, other systems for crushing lead-acid batteries and separating the crushed components thereof have been described in U.S. Pat. No. 3,300,043; 3,393,876; 3,561,684; 3,777,994; 3,892,563; and 4,042,177. In this invention, lead-acid batteries are crushed and then the battery mud or the battery mud and crushed metallics are separated from the other crushed battery components. Either during crushing or shortly after crushing has occurred, the crushed material is treated with an aqueous solution of an alkali metal salt or an alkali metal hydroxide. The alkali metal reagent, for example, sodium carbonate or hydroxide, reacts with the lead sulfate in and the sulfuric acid in the battery mud by either of the following reactions:

$$PbSO_4 + Na_2CO_3 \rightarrow PbCO_3 + Na_2SO_4$$

$$PbSO_4 + 2NaOH \rightarrow Pb(OH)_2 + Na_2SO_4$$

The battery mud, when reacted with the alkali metal reagent, should have a solids content of about 5% to about 30% with a range of about 10% to about 20% being preferred for ease of commercial operation.

The lead sulfates contained in the battery mud react to form a soluble alkali metal sulfate which in turn forms an aqueous solution of alkali metal sulfate. The lead contained in the lead sulfate forms a lead compound precipitate. The aqueous alkali metal sulfate solution containing the sulfates is then separated from the lead compound precipitate and solid PbO and $PbO_2$ by use of conventional separation techniques such as settling or centrifuging. The lead values in the battery mud are thereby separated from the sulfates in an efficient and rapid manner and may then be recovered by such techniques as smelting.

Examples of suitable alkali metal salts include $Na_2CO_3$, $NaHCO_3$, $Li_2CO_3$, $LiHCO_31$, $K_2CO_3$, and $KHCO_3$. Suitable alkali metal hydroxides include NaOH, KOH, and LiOH. The alkali metal reagent should be included in an amount sufficient to neutralize the residual $H_2SO_4$ and to combine with the essentially all of the $PbSO_4$ contained in the battery mud to produce either $PbCO_3$ or Pb(OH) along with the alkali metal sulfate. Neutralization of the sulfuric acid is important in that it serves to minimize corrosion of the processing equipment.

A preferred embodiment of the practice of the invention is illustrated in the sole FIGURE. Lead acid batteries are received and placed in a storage area where acid is permitted to drain from the batteries. The partially drained batteries are then fed onto vibrator feed hopper 10 which feeds the batteries to conveyor belt 11. Conveyor belt 11 feeds the battery to roll crusher 12. Second conveyor 13 transports the crushed batteries to second crusher 14 which commutes the batteries into small pieces comprising crushed metallics, crushed cases and separators, and battery mud. The crushed metallics comprise crushed lead alloy grids and terminals while battery mud comprises sulfuric acid, lead sulfate, PbO and $PbO_2$.

At crusher 14 an aqueous solution of a alkali metal reagent, preferably a 7% aqueous solution of sodium carbonate, is added over line 15 to the crushed material. Sodium carbonate functions to neutralize residual sulfuric acid and converts the lead sulfate to lead carbonate precipitate and to an aqueous solution of sodium sulfate by the following reactions:

$$H_2SO_4 + Na_2CO_3 \rightarrow Na_2SO_4 + H_2O + CO_2$$

$$PbSO_4 + Na_2CO_3 \rightarrow PbCO_3 + Na_2SO_4$$

The treated crushed battery material from crusher 14 is then fed over line 16 to vibrator screen 17. The battery mud portion in the small metallic fines then passes through the vibrator screen 17. The crushed battery cases and separators and large crushed metallics pass over the vibrator screen 17 and are removed over line 18. Sprays of recycled water are introduced over line 40 and directed to the screen to clean the larger crushed pieces as well as to aid in passing the battery mud through the screen. The undersized battery mud and metallic fines, from vibrator screen 17 are then fed over line 19 into spiral classifier 20.

At spiral classifier 20 metallic fines are transported up the classifier and fed into ball mill 21. Ball mill 21, by a hammering action, separates any battery mud still adhering to the crushed metallic fines. The metallic fines in the battery mud of the ball mill 21 are then transferred over line 22 to vibrating screen 23. A recycled water stream is passed over line 24 into vibrating screen 23. Battery mud is separated from metallic fines by passage through the vibrating screen and is then transferred over a line 25 into a collection tank 26. The metallic fines are removed from the vibrating screen 23 over line 27.

The overflow from spiral classifier 20, containing mostly battery mud along with residual crushed battery separator, is transferred over line 28 to vibrating screen 29. A stream of recycled water is directed over line 30 onto vibrating screen 29. The residual battery separators pass over the vibrating screen 29 and are removed over line 31. The battery mud passes through vibrating screen 29 and is transferred to a collection tank 26 over line 32.

The slurry in collection tank 26 is approximately 15% solids and 85% of an aqueous solution of sodium sulfate.

The solids of the slurry comprise PbO, $PbO_2$, lead carbonate, and as yet, unreacted lead sulfate. The slurry in the collection tank is then transferred over line 33 by a pump to thickening tank 34. In thickening tank 34, the slurry is concentrated from about 15% solids to about 60% solids. The solids concentrate at the bottom of the thickening tank 34 while there and an aqueous solution of sodium sulfate forms at the top. The aqueous solution of sodium sulfate is then removed over line 35 from the concentrated slurry. Part of the sodium sulfate solution is utilized as the source of recycled water described previously in this description.

The 60% concentrated slurry at the bottom of thickening tank 34 is then fed over line 36 to vacuum filter 37. At vacuum filter 37, the lead compound solids are further concentrated into a 15% moist filter cake. The aqueous filtrate is removed over line 38.

The filter cake containing the lead bearing material is then pelletized and further dried to a moisture content of about 10%.

It is claimed:

1. A process for desulfating battery mud in a lead-acid battery recycling process, comprising:
    a. crushing lead-acid batteries to obtain a crushed material comprising crushed battery cases and separators, crushed metallics, and battery mud comprising sulfuric acid, $PbSO_4$, PbO, and $PbO_2$;
    b. adding an aqueous solution containing an alkali metal reagent in an amount sufficient to neutralize said sulfuric acid and to combine with essentially all of said $PbSO_4$, said alkali metal reagent being selected from the group consisting of water soluble alkali metal salts, alkali metal hydroxides, and admixtures thereof, to said crushed material to form an aqueous slurry of alkali metal sulfate and precipated lead compounds having a solids content of from about 10–20%;

c. separating said crushed battery cases and separators, and said crushed metallics from said battery mud containing said precipitated lead compounds; and d. separating said battery mud from said alkali metal sulfate.

2. The process of claim 1, wherein:
said alkali metal salts comprise a member selected from the group consisting of $Na_2CO_3$, $NaHCO_3$, $K_2CO_3$, $KHCO_3$, $Li_2CO_3$, $LiHCO_3$, and admixtures thereof.

3. The process of claim 2, wherein:
said alkali metal salt comprises $Na_2CO_3$.

4. The process of claim 5, wherein:
said alkali metal hydroxide comprises NaOH.

5. The process of claim 1, wherein:
said alkali metal hydroxides comprise a member selected from the group consisting of NaOH, KOH, LiOH, and admixtures thereof.

* * * * *